(12) United States Patent
Usoro et al.

(10) Patent No.: US 8,109,087 B2
(45) Date of Patent: Feb. 7, 2012

(54) OVERHEATING PROTECTION FOR SHAPE MEMORY ALLOY ACTUATORS

(75) Inventors: Patrick B. Usoro, Troy, MI (US); Xiujie Gao, Troy, MI (US); Richard J. Skurkis, Lake Orion, MI (US); Paul W. Alexander, Ypsilanti, MI (US); Alan L. Browne, Grosse Pointe, MI (US); Guillermo A. Herrera, Winnetka, CA (US); Geoffrey P. McKnight, Los Angeles, CA (US); Nancy L. Johnson, Northville, MI (US); Nicholas William Pinto, Ferndale, MI (US); Kenneth A. Strom, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 402 days.

(21) Appl. No.: 12/437,867

(22) Filed: May 8, 2009

(65) Prior Publication Data
US 2009/0277169 A1    Nov. 12, 2009

Related U.S. Application Data

(60) Provisional application No. 61/051,351, filed on May 8, 2008.

(51) Int. Cl.
*F01B 29/10* (2006.01)
*F02G 1/04* (2006.01)

(52) U.S. Cl. ............... 60/528; 60/527; 60/529
(58) Field of Classification Search ............ 60/527–529
See application file for complete search history.

(56) References Cited

U.S. PATENT DOCUMENTS

| | | | | |
|---|---|---|---|---|
| 3,703,693 A | * | 11/1972 | Levinn | 337/1 |
| 3,725,835 A | * | 4/1973 | Hopkins et al. | 337/140 |
| 4,325,217 A | * | 4/1982 | Golestaneh | 60/527 |
| 4,860,040 A | * | 8/1989 | Tamamura et al. | 396/89 |
| 5,410,290 A | * | 4/1995 | Cho | 337/140 |
| 6,546,806 B1 | * | 4/2003 | Varma | 73/775 |

FOREIGN PATENT DOCUMENTS

| | | |
|---|---|---|
| JP | 60-036786 A | 2/1985 |
| JP | 61-046478 A | 3/1986 |
| JP | 01-163478 A | 6/1989 |
| JP | 05-248341 A | 9/1993 |
| JP | 2004-245155 A | 9/2004 |

* cited by examiner

*Primary Examiner* — Thomas Denion
*Assistant Examiner* — Christopher Jetton (57) ABSTRACT

An overheating protection system adapted for use with a shape memory alloy actuator element, includes at least one switching shape memory alloy element presenting a slower activation period than that of the actuator element, and configured to selectively prevent activation of the actuator element, when the actuator element is actually or predicted to be experiencing overheating; and a circuit comprising the system, wherein the switching element and/or a circuit implement functions to modify activation of the actuator element.

11 Claims, 9 Drawing Sheets

OVERHEATING PROTECTION FOR SHAPE MEMORY ALLOY ACTUATORS

RELATED APPLICATIONS

This patent application makes reference to, claims priority to, and claims benefit from U.S. Provisional Patent Application Ser. No. 61/051,351, entitled "CONTROL METHODS FOR SMA ACTUATORS," filed on May 8, 2008.

BACKGROUND OF THE INVENTION

1. Field of the Invention

The present disclosure generally relates to methods and systems for controlling SMA actuators, and more particularly, to methods of and systems for providing overheating protection to an SMA actuator.

2. Discussion of Prior Art

Shape memory alloy (SMA) actuators are activated by heating the SMA material to a temperature that is above a prescribed value. This causes the material to undergo phase transformation from a Martensitic to an Austenitic state, wherein it contracts and in the process is used to do work. Typically, SMA wires are heated through resistive heating by applying an electrical current through the wire. A concern with this approach is overheating (i.e., applying an excess of heat energy above what is required to actuate the wire). Overheating causes longer cooling times, and therefore reduced system response bandwidth, and in some cases may damage the wire. It is therefore desirable to have an effective and robust means of preventing wire overheating. Traditionally, various external sensors and/or mechanical devices such as temperature sensors have been used to alleviate concerns relating to overheating. However, these provisions add to the complexity, costs, and packaging requirements of conventional actuators.

BRIEF SUMMARY OF THE INVENTION

The present invention addresses these concerns, and recites novel methods of and systems for providing overheating protection to an SMA actuator utilizing a switching SMA element or circuit implement. Among other things, the invention is useful for enabling the SMA actuator to be maintained in the on-state for extended periods without overheating the wire.

In one embodiment, the invention offers an overheat protection system for SMA actuators that utilizes shape memory effect to disconnect the electric power supply to the SMA wire. The actuator includes at least one shape memory alloy element presenting a first transformation temperature range, communicatively coupled to an activation signal source, and drivenly coupled to a load. The system includes a switching shape memory alloy element that is thermally coupled to the actuator element, so as to be activated thereby. The switching SMA element presents a second transformation temperature range greater than the first, and the actuator, source and element are cooperatively configured such that the switching SMA element is operable to interrupt communication between the actuator and source, when the second range is exceeded.

In a second aspect of the invention, various configurations are presented that result in slower actuation times for a switching SMA element(s) that may otherwise present a transformation temperature range equal to the actuator. For example, embodiments include a switching SMA wire presenting a total cross-sectional area greater than the area of the actuator wire, a plurality of switching SMA wires cooperating to selectively disengage an electrical contact or switch, connecting the switching and actuator wires in parallel and the switching SMA wires in parallel and/or series to one or more resistor, etc.

Finally, in a third aspect of the invention, an overheating protection circuit comprises the SMA actuator, an adjustable circuit implement, and a power source communicatively coupled to the actuator. The source is operable to produce, and expose the element to, an activation current within the circuit. The circuit implement is operable to selectively modify the current. When a controller is needed, it is communicatively coupled to the source, actuator, and implement, and configured to identify an overheating event, and cause the implement to modify the current when the event is identified. The overheating event, in some cases, may be detected by the controller through a signal caused by a switching SMA wire.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein.

DETAILED DESCRIPTION OF THE INVENTION

The following description of the preferred embodiments is merely exemplary in nature and is in no way intended to limit the invention, its application, or uses. As described and illustrated herein, a novel overheating protection system 10 is adapted for use with a shape memory alloy (SMA) actuator element (e.g., wire) 12; however, it is certainly within the ambit of the invention to utilize the benefits of the system 10 with other thermally or electrically activated active materials susceptible to overheating, or in other applications and configurations as discernable by those of ordinary skill in the art.

In a first aspect, the system 10 utilizes the shape memory effect of a switching SMA element (e.g., wire) 14 to interrupt the activation signal of the actuator element 12. That is to say, the system 10 includes a switching SMA wire 14 that is not directly employed in doing useful mechanical work, but is thermally connected to and operable to deactivate the actuator (active) wire 12. As used herein the term "wire" is not used in a limiting sense, and shall include other similar geometric configurations presenting tensile load strength/strain capabilities, such as cables, bundles, braids, ropes, strips, chains, etc. Various embodiments of the system 10 are shown in FIGS. 1-10b, wherein each, the electrical connectivity of the switching and actuator wires 14,12 is selectively interruptible, when the actuator wire 12 is or predicted to be overheated.

In a second aspect of the invention, the system 10 generally presents a circuit 16 composed of the actuator element 12, an electrical power source 18 operable to generate a sufficient activation signal, and at least one circuit implement 20 operable to modify the signal. As used herein, the term "circuit implement" shall mean any electrical component that when added to the circuit 16 autonomously functions to modify the current flow, and therefore the activation signal generated by the power source 18 when a predetermined actuator temperature is reached (the switching wire 14, where Joule heated, presents such a circuit implement 20). As such, it is appreciated that it may be necessary to combine the implement 20 with suitable sensory, control, and/or communication technology. For example, a thermal bead may be used to provide in-situ wire temperatures. Examples of circuit implements are further described herein and illustrated at FIGS. 11-12.

As used herein, shape memory alloys (SMA's) refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or Martensite phase, shape memory alloys can be pseudo-plastically deformed and upon exposure to some higher temperature will transform to an Austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system 10 with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change (recovery of pseudo-plastic deformation induced when in the Martensitic phase) of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable.

Figure 1:
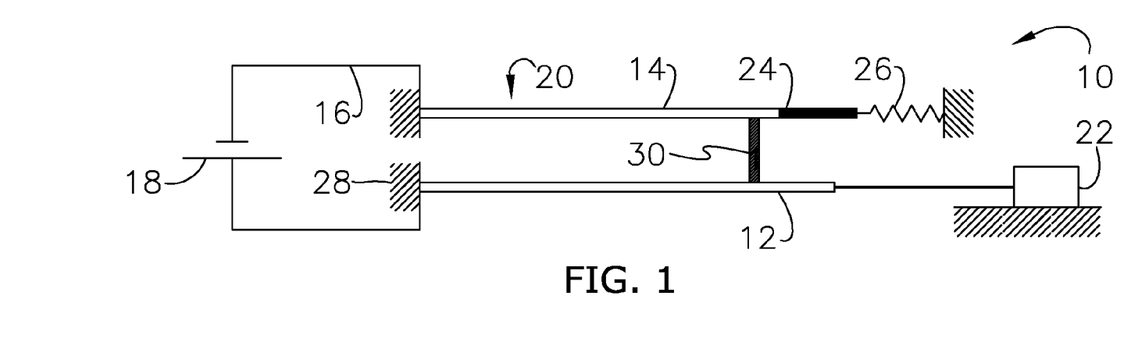
FIG. 1 is a diagram of an overheating protection system forming a circuit and including an electric power source, shape memory alloy actuator wire drivenly coupled to a load, a switching SMA wire electrically and thermally coupled to the actuator, an electrical non-conductor, and a return spring drivenly coupled to the non-conductor, in accordance with a preferred embodiment of the invention.

Returning to the structural configuration of the present invention, FIG. 1 shows an overheating protection system 10 forming a circuit 16 and including an electric power source 18, a shape memory alloy actuator wire 12 drivenly coupled to a load 22, a switching SMA wire 14 electrically and thermally coupled to the actuator wire 12, an electrical non-conductor 24, and a return spring (or otherwise biasing element) 26 preferably provided and drivenly coupled to the non-conductor 24. It is appreciated that the electrical nonconductor 24 signifies an electrical switch that can be implemented in a variety of ways known in the art and aimed at providing the capability to open and close electrical circuit 16 in response to the action of the switching SMA wire 14. The several components described herein may be integral or variably combined, and interconnection between adjacent parts is performed using suitable methods, such as bonding, welding, etc.

Figure 1A:
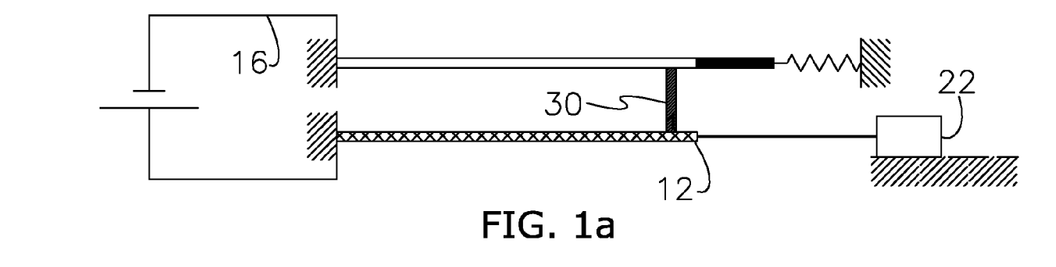
FIG. 1a is a diagram of the system shown in FIG. 1, wherein the actuator but not the switching SMA wire has been activated.

In FIG. 1, the transformation temperature range of the switching SMA wire 14 is preferably slightly (e.g., not more than 50%, more preferably, 25%, and most preferably, 10%) higher than the transformation temperature range of the actuator wire 12. When the temperature of the actuator wire 12 is higher than its transformation temperature range, the actuator wire 12 is caused to contract and move the load 22 (FIG. 1a). When the temperature of the switching wire 14 is higher than its transformation temperature range, the switching wire 14 contracts and causes the electrical connectivity of the wires 12,14 to be interrupted (FIG. 1b); that is to say, it causes the non-conductor 24 to slide to a position intermediate the wires 12,14. This terminates the activation signal to both wires 12,14, and stores potential energy in the spring 26.

Figure 1B:
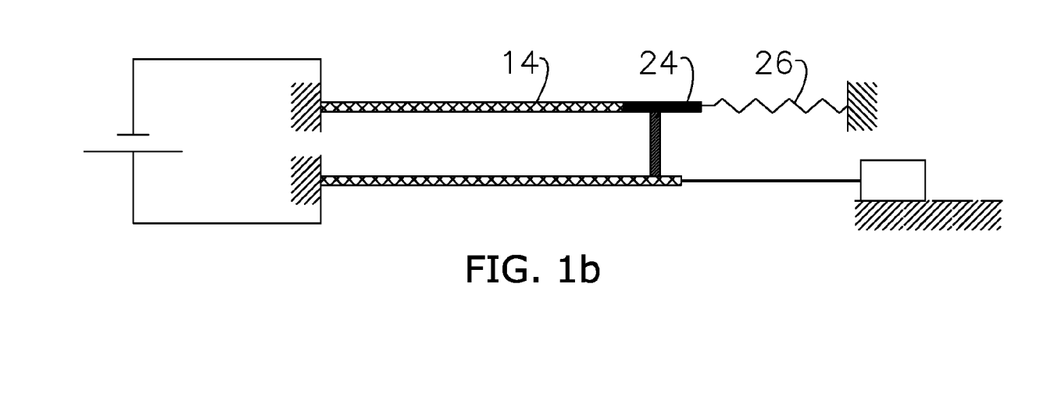
FIG. 1b is a diagram of the system shown in FIG. 1, wherein the switching SMA wire has also been activated, so as to cause the non-conductor to disconnect the wires and the spring to store energy.

Once the wires 12,14 cool down below the transformation temperature of the switching wire 14, the return spring 26, generally shown attached at the end of the switching wire 14, pulls them back to their normal (or deactivated) positions, so as to re-establish electrical connection. Alternatively, it is appreciated that the switching wire(s) 14 may exhibit two-way shape memory effect, such that the electrical connectivity is autonomously returned when deactivated. Thus, in this configuration, the electric power can be turned on and off by the switching wire 14 without perturbing the load 22.

More particularly, in FIGS. 1-1b, the actuator wire 12 is connected to fixed structure 28 at one end and to the load 22 at the other end. The switching SMA wire 14 is connected to fixed structure 28 at one end and to an electrical non-conductor 24 at the other end. The return spring 26 is also anchored to fixed structure 28. The electrical non-conductor 24 is preferably a good thermal conductor. An electric/thermal conductor 30 is positioned between SMA wires 12,14 and configured such that electricity and heat can be transmitted there between, and relative mechanical displacement can be realized between the electric/thermal conductor 30 and actuator wire 12, as well as between, the electrical/thermal conductor 30, the switching wire 14, and the electrical non-conductor 24 attached thereto.

The power source 18 is connected to the wires 12,14, configured to feed an electric series circuit 16 from one terminal of the electric power source 18 to the switching wire 14 through the electric/thermal conductor 30 to the actuator wire 12, and finally through to the other terminal of the source 18. When the temperatures of the wires 12,14 are below their transformation temperature ranges, both are in the Martensite state, the load 22 is not moved and the return spring 26 has sufficient force to cause the switching wire 14 to maintain electrical connectivity with the actuator wire 12 through the electric/thermal conductor 30.

As electrical power is supplied to the system 10, the wires 12,14 are heated resistively through a process known as "Joule heating". When the temperature of the wires 12,14 exceed the transformation temperature range for the actuator wire 12, it undergoes a phase transformation from Martensite to Austenite that causes it to contract and pull the load 22. At this stage, if the transformation temperature for the switching wire 14 is higher than that for actuator wire 12, then the switching wire 14 remains in the Martensite state and the electrical circuit remains on, so that the wires 12,14 continue to be resistively heated. When the temperature of the wires 12,14 exceed their respective transformation temperatures, the switching wire 14 undergoes a phase transformation from Martensite to Austenite causing it to contract and move the electrical non-conductor 24 to contact the electric/thermal conductor 30, therefore causing electrical connection between the wires 12,14 to be disrupted. This action ensures that the wires 12,14 do not get heated above the transformation temperature range of the switching wire 14. Once the wires 12,14 cool below the transformation temperature of the switching wire 14, the process reverses and electrical connectivity is resumed.

It is appreciated that the transformation temperature of the wires 12,14 could be the same, but it is preferable that the transformation temperature of the switching wire 14 be higher than that of actuator wire 12 to ensure robust actuation. In such a case, the switching wire 14 can turn the electric power source 18 on and off without the actuator wire 12 changing from the Austenite state, thus enabling the position of the load 22 to be maintained until the power source 18 is permanently switched off.

Figure 2:
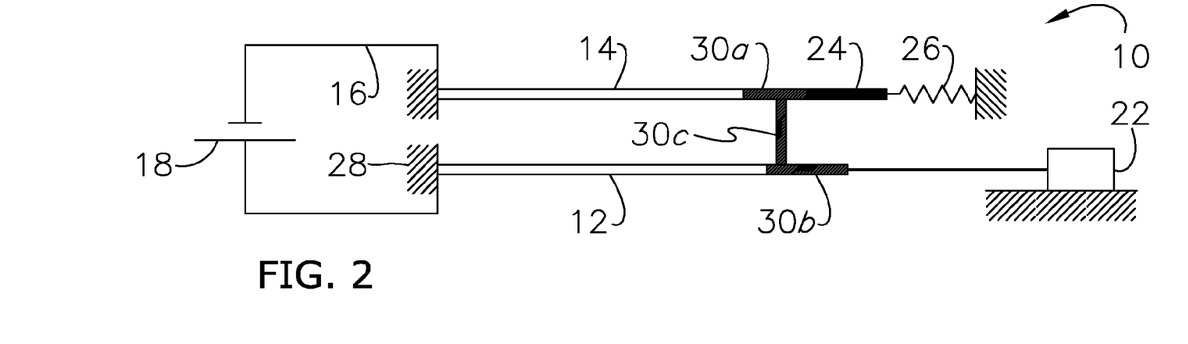
FIG. 2 is a diagram of the system shown in FIG. 1, further including a plurality of electrical and thermal conductors interconnecting the wires, wherein one of the conductors is connected to the switching SMA wire and non-conductor, and slidingly engages the remaining conductors and actuator wire, in accordance with a preferred embodiment of the invention.

In FIG. 2, a plurality of electrical and thermal conductors 30a-c, interconnect the wires 12,14, so as to reduce SMA wire interaction with sliding forces. More particularly, one of the conductors 30a is connected to the switching wire 14 and the non-conductor 24, a second 30b is connected to the actuator wire 12, and a third 30c laterally interconnects the first and second conductors 30a,b. Preferably, the first and second 30a,b are connected to the wires 12,14 at their distal ends. The first connector 30a slidingly engages the remaining conductors 30b,c, and is longitudinally configured to clear the lateral conductor 30b based on the available strain of the switching wire 14. Again, this embodiment is appropriate for applications where it is not desirable to subject the wires 12,14 to rubbing.

Figure 3:
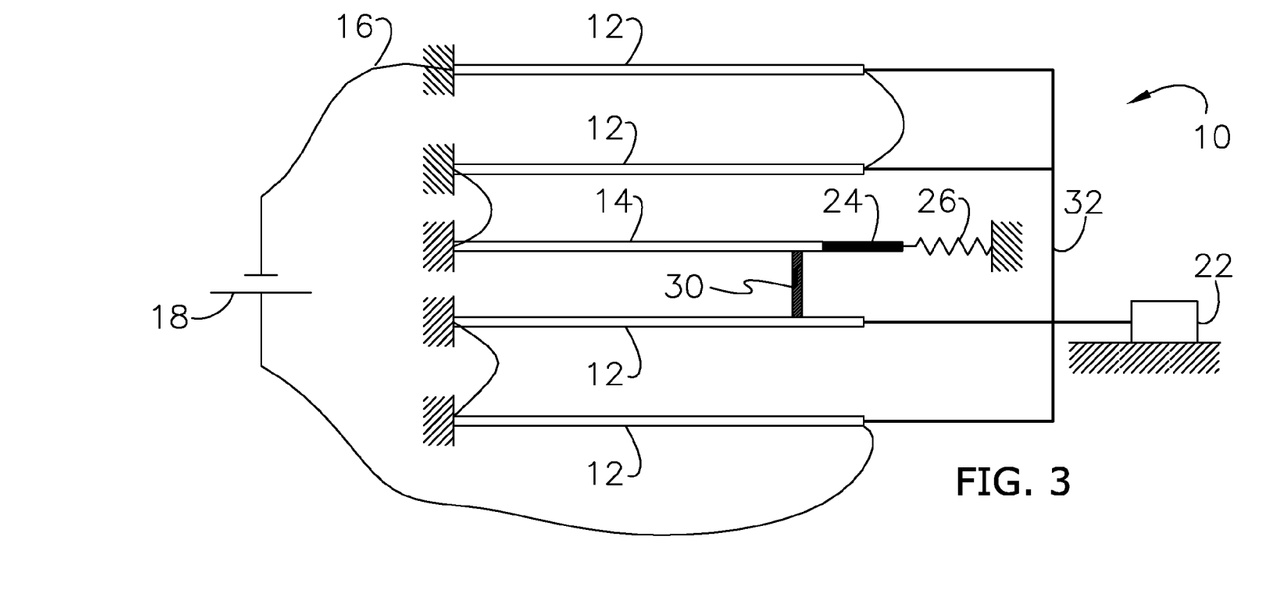
FIG. 3 is a diagram of the system shown in FIGS. 1 and 2, wherein a plurality of actuator wires are connected in parallel to the load, and the switching SMA wire is medially positioned, in accordance with a preferred embodiment of the invention.

As shown in FIG. 3, it is appreciated that a plurality of actuator wires 12 may be connected in parallel to the load 22. For example, and as shown, each actuator wire 12 may be connected to a cross-link 32, further connected to the load 22. Here, the link 32 is preferably confined so as to present linear motion only, and as such, may be configured to be received within a race or track (not shown). This reduces the need to provide congruent (i.e., generally simultaneously and equivalent) activation for all of the wires 12. Where the switching wire 14 is to be thermally coupled to each wire 12, it is preferred that it be medially positioned (FIG. 3), so as to get a truer reading of the overall or aggregate temperature of the wires 12.

Figure 4:
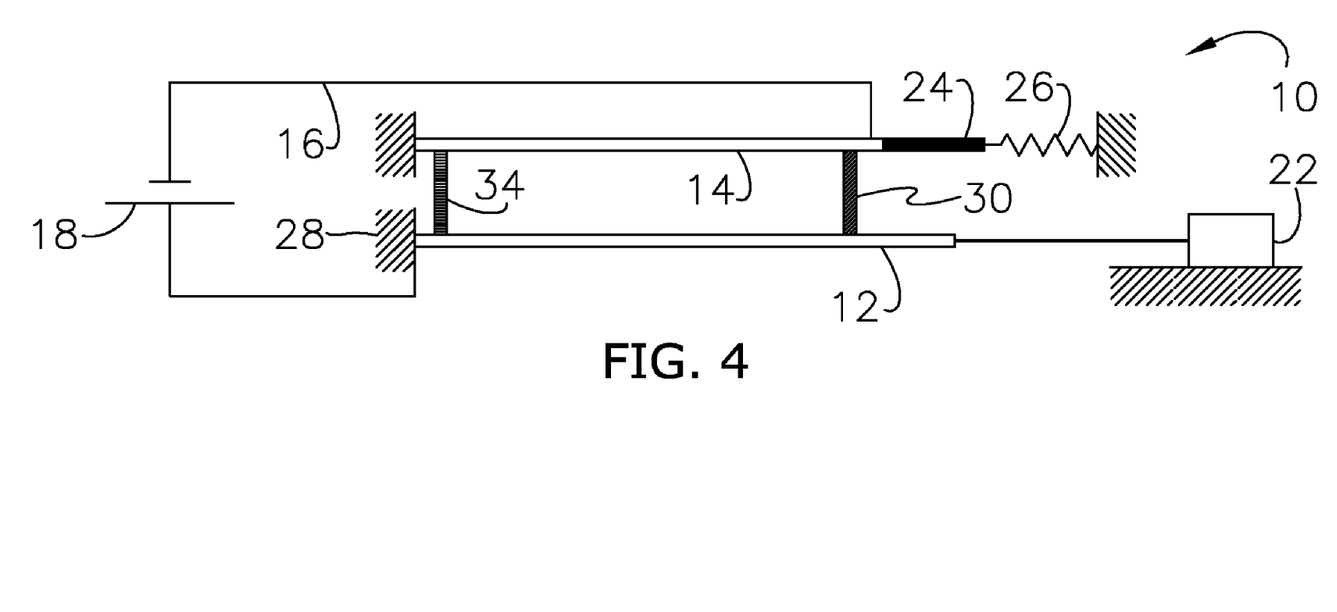
FIG. 4 is a diagram of the system shown in FIG. 1, wherein a thermally conducting and electrically non-conducting lateral member further interconnects the actuator and switching SMA wires, in accordance with a preferred embodiment of the invention.

As shown in FIG. 4, at least one thermally conducting and electrically non-conducting lateral member 34 may be further provided to interconnect the actuator and switching wires 12,14. Here, the electrical circuit 16 may be connected to the distal end of the switching SMA wire 14, and configured to bypass the switching wire 14. In this configuration, the switching SMA wire 14 is not electrically heated; rather it is heated by heat transfer from the actuator wire 12. As in the previous cases, activation of the switching SMA wire 14 causes the electrical circuit to be opened. It is appreciated that good thermal connection between the wires 12,14 along their longitudinal profiles is necessary to better provide temperature uniformity.

Figure 5:
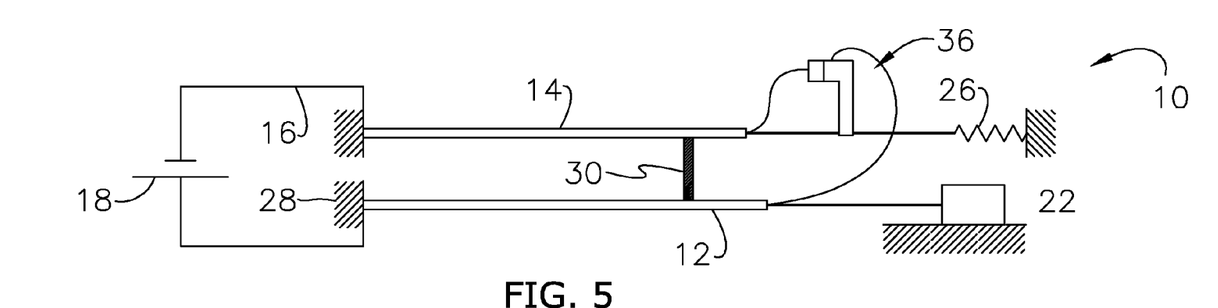
FIG. 5 is a diagram of an overheating protection system forming a circuit and including an electric power source, shape memory alloy actuator wire drivenly coupled to a load, a switching SMA wire electrically and thermally coupled to the actuator wire and drivenly coupled to a switch, and a return spring drivenly coupled to the switch opposite the switching wire, in accordance with a preferred embodiment of the invention.
Figure 5A:
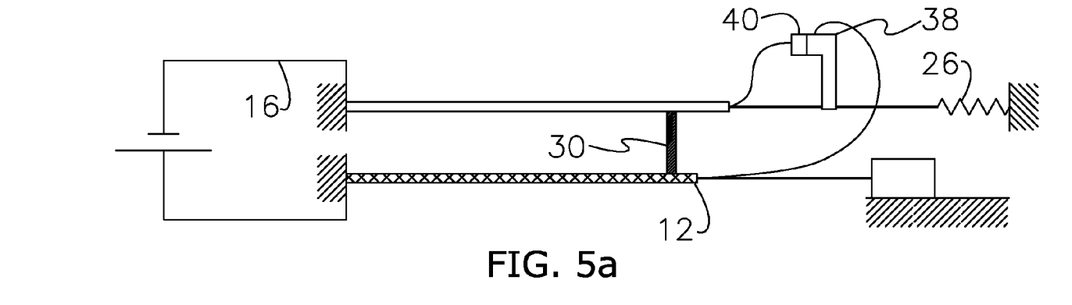
FIG. 5a is a diagram of the system shown in FIG. 5, wherein the actuator wire has been activated so as to displace the load.
Figure 5B:
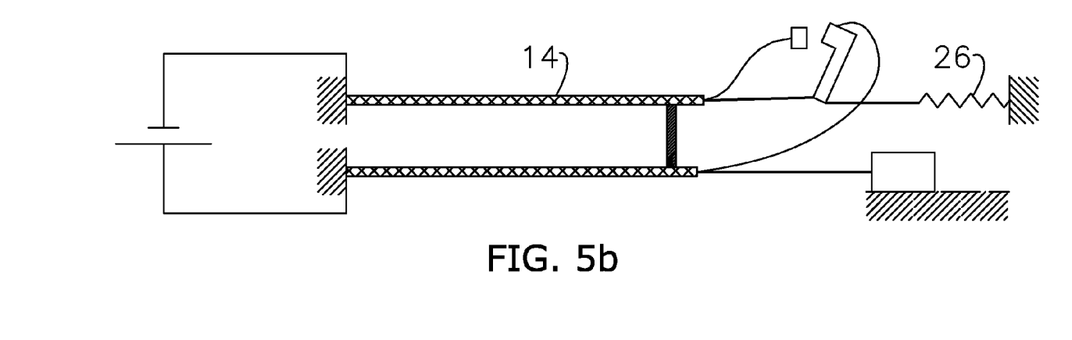
FIG. 5b is a diagram of the system shown in FIG. 5a, wherein the switching SMA wire has also been activated so as to toggle the switch and open the circuit.

In another embodiment, the system 10 includes a switching SMA wire 14 electrically and thermally coupled to the actuator wire 12, and drivenly coupled to a switch 36 (FIGS. 5-5b). The switch 36 comprises a main member 38 electrically connected to the actuator wire 12, and a contact 40 electrically connected to the switching wire 14 (or vise versa). The return spring 26 is also drivenly coupled to the main member 38 but acts opposite the switching wire 14. As exemplary shown in FIG. 5b, when the switching wire 14 is activated the switch 36 may be caused to open by pivoting the main member 38 about an axis in a first direction. Here, the spring 26 is caused to store energy. When deactivated, the spring 26 causes the member 38 to reverse pivot about the axis in the opposite direction, and re-engage the contact 40, so as to close the circuit 16. In this configuration, it is appreciated that less wire contraction is required to open the circuit 16. It is also appreciated that a large variety of switch types exists and these can be appropriately utilized to realize the described effect. The configuration shown in FIGS. 5-5b is for the purpose of illustrating the basic concept.

In another aspect of the invention, it is appreciated that the wires 12,14 may otherwise differ in physical property, location, and/or configuration in order to effect the desired unequal activation periods. For example, the switching wire 14 may be identical to the actuator wire 12 but positioned in a cooler environment (e.g., exposed to greater airflow) that results in the switching wire 14 experiencing longer heating periods and shorter cooling periods in comparison to the actuator wire 12. This further promotes a steady on-state for the actuator wire 12.

Figure 6:
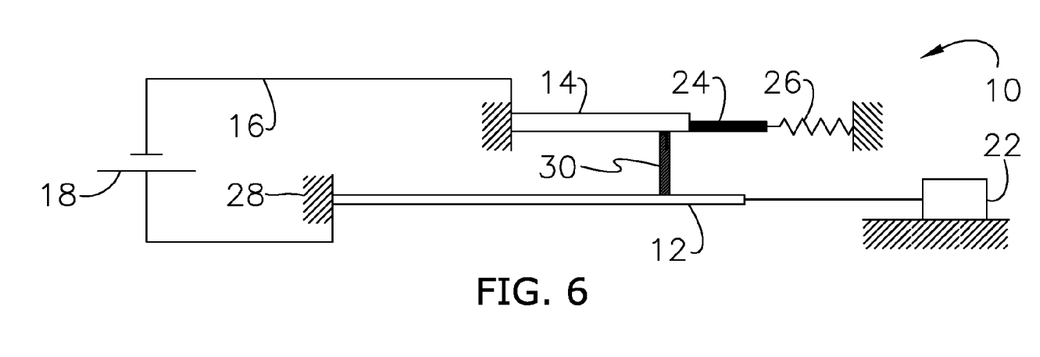
FIG. 6 is a diagram of an overheating protection system forming a circuit and including an electric power source, shape memory alloy actuator wire drivenly coupled to a load, a switching SMA wire electrically and thermally coupled to and presenting a cross-sectional area larger than the actuator wire, an electrical non-conductor, and a return spring drivenly coupled to the non-conductor, in accordance with a preferred embodiment of the invention.
Figure 6A:
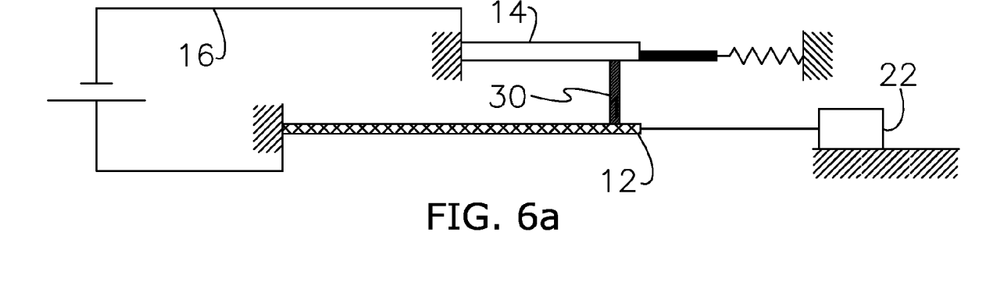
FIG. 6a is a diagram of the system shown in FIG. 6, wherein the actuator wire has been activated, so as to displace the load.
Figure 6B:
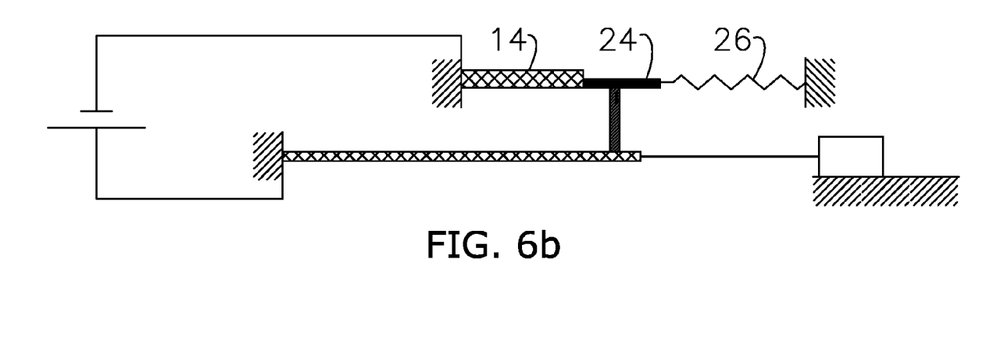
FIG. 6b is a diagram of the system shown in FIG. 6a, wherein the switching SMA wire has also been activated, so as to cause the non-conductor to open the circuit.
Figure 7:
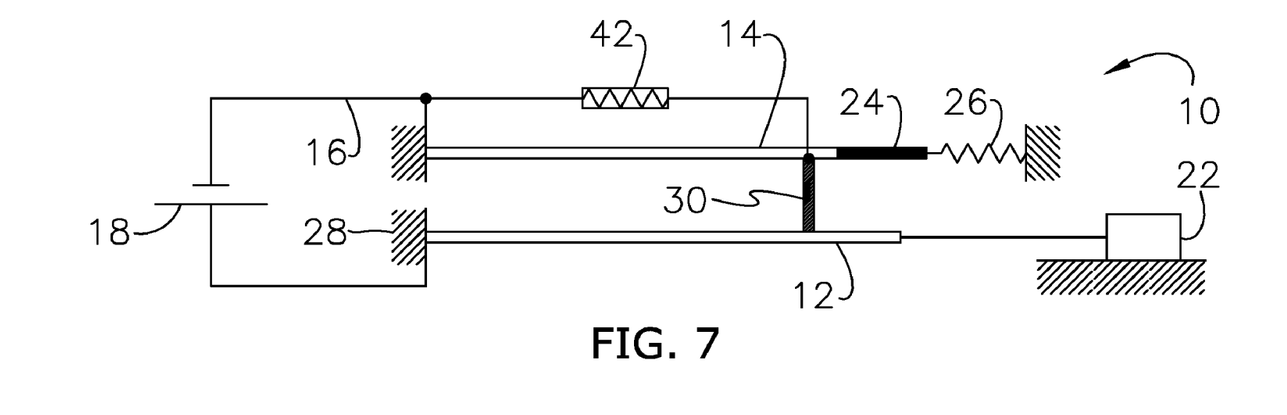
FIG. 7 is a diagram of an overheating protection system forming a circuit and including an electric power source, shape memory alloy actuator wire drivenly coupled to a load, a switching SMA wire electrically coupled to the actuator wire, a resistor connected in parallel to the switching SMA wire, an electrical non-conductor coupled to the switching SMA wire, and a return spring drivenly coupled to the non-conductor, in accordance with a preferred embodiment of the invention.

In FIGS. 6-6b, the switching wire 14 presents a cross-sectional area larger than that of the actuator wire 12. A single switching wire 14 may present a larger area than the actuator wire 12; or, a plurality of switching wires 14 presenting individual cross-sectional areas not greater than, but a total area greater than the actuator wire area may be utilized. As such, the switching wire 14 is caused to activate slower, even where the wires 12,14 present identical compositions and transformation temperature ranges.

In this configuration, the switching wire 14 may be thermally and electrically coupled to the actuator wire 12, as previously presented; or, solely electrically coupled thereto (FIGS. 6-6b). In the latter case, the switching wire 14 is preferably configured to activate when it is predicted that the actuator wire 12 will begin overheating, inclusive of a factor of safety readily determinable by those of ordinary skill in the art. For example, the cross-sectional area ratio may be selected to produce this outcome. As previously described, when activated the switching wire 14 causes the non-conductor 24 to open the circuit 16 (FIG. 6b).

In another embodiment, energy dissipation is provided by a further circuit implement, such as a resistor 42 (FIG. 7) connected in parallel to the switching wire 14. As a result, the switching wire 14 has less current passing through it, and is therefore heated slower than the actuator wire 12. The switching wire 14 and energy dissipating resistor 42 are cooperatively configured such that the switching wire 14 will activate when it is predicted that the actuator wire 12 will experience overheating, inclusive of a factor of safety.

Figure 8:
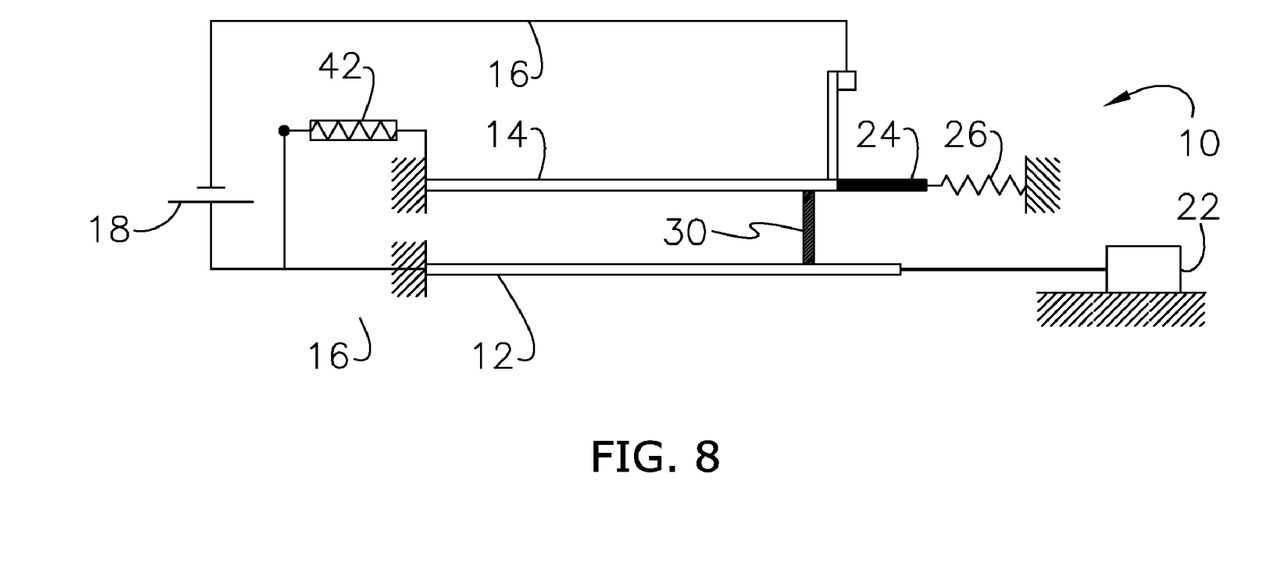
FIG. 8 is a diagram of an overheating protection system including an electric power source, shape memory alloy actuator wire drivenly coupled to a load, a switching SMA wire connected in parallel electrically to the actuator wire, a resistor connected in series to the switching SMA wire, an electrical switch mechanically coupled to the switching SMA wire, and a return spring drivenly coupled to the electrical switch, in accordance with a preferred embodiment of the invention.

Alternatively, it is appreciated that the switching and actuator wires 12,14 may also be connected in parallel (FIG. 8). Here, the switching wire 14 must once again experience a slower rate of heating, and is preferably fully activated, when it is predicted that the actuator wire 12 will begin to experience overheating. To effect a slower rate of heating, for example, the switching wire 14 may be connected in series to a resistor 42 (FIG. 8). The system is configured such that the electric circuit 16 is opened when the switching SMA wire 14 is activated.

Figure 9:
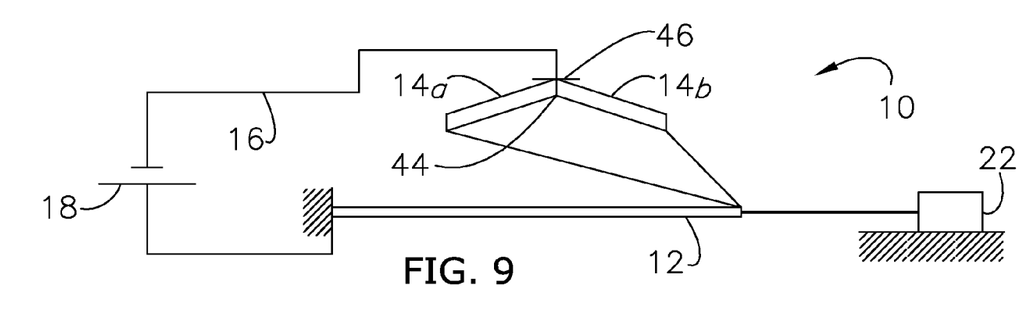
FIG. 9 is a diagram of an overheating protection system forming a circuit and including an electric power source, shape memory alloy actuator wire drivenly coupled to a load, and first and second interconnected switching SMA wires electrically and thermally coupled to the actuator wire, wherein the switching SMA wires form a translatable vertex engaging an electrical contact, so as to close the circuit, in accordance with a preferred embodiment of the invention.
Figure 9A:
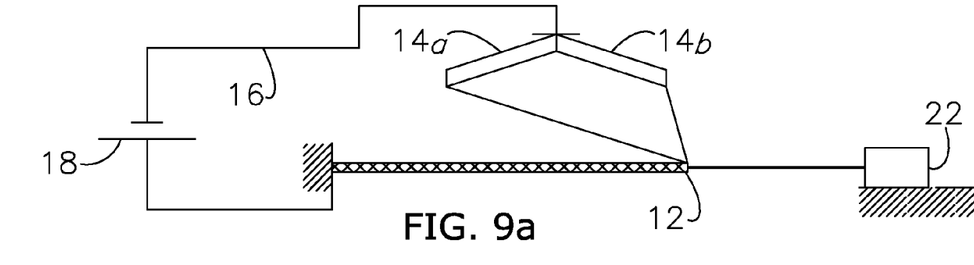
FIG. 9a is a diagram of the system shown in FIG. 9, wherein the actuator wire has been activated so as to displace the load.

In other embodiments, first and second interconnected switching wires 14a,b are electrically coupled to the actuator wire 12 (FIGS. 9-10b) and cooperatively configured to selectively open the circuit 16. In FIG. 9, the wires 14a,b are connected so as to define a vertex 44 and distal ends. The switching wires 14a,b are electrically coupled to the actuator wire 12 preferably at the distal ends, which are translatably fixed, so as to form two separate branches. The vertex 44 is translatable and configured to engage an electrical contact 46 further composing the circuit 16, when the wires 14a,b are in the fully deactivated (or normal) state. In this configuration, the circuit 16 is closed, so as to allow the activation current to flow through the actuator and switching wires 12,14.

Figure 9B:
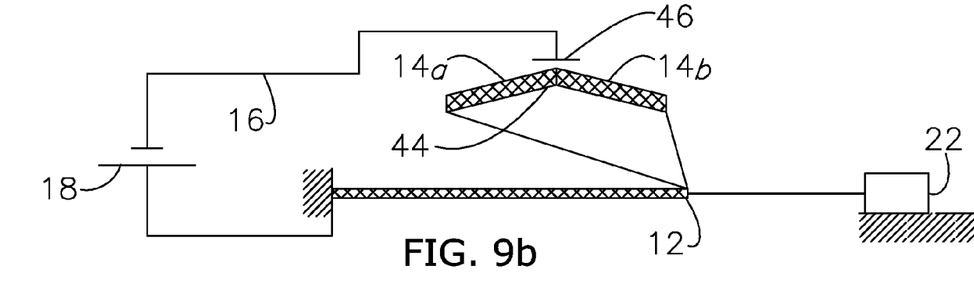
FIG. 9b is a diagram of the system shown in FIG. 9a, wherein the switching SMA wires have also been activated, so as to cause the vertex to be spaced from the contact and open the circuit.

When the switching wires 14a,b are heated to a temperature past their Austenite finish temperature(s), they are caused to contract such that the vertex 44 migrates away from the contact 46 (FIG. 9b). Here, again, the switching wires 14a,b are configured to be activated later than the actuator wire 12, and accordingly, may present a transition temperature, or total cross sectional area greater than that offered by the actuator wire 12. It is appreciated that each switching wire 14 may present a cross-sectional area less than that of the actuator wire 12, since only half the current will flow through each branch. It is also appreciated that the vertex 44 magnifies displacement according to the trigonometric relationship presented by the geometry of the wires 14a,b, which proportionately reduces wire cost. Although not shown, a return spring can be used to push the vertex back into contact with the contact 46.

Figure 10:
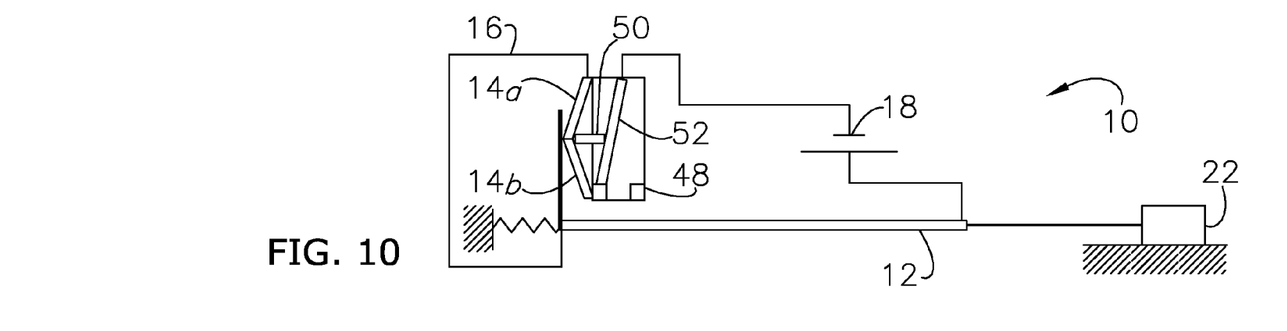
FIG. 10 is a diagram of an overheating protection system forming a circuit and including an electric power source, shape memory alloy actuator wire drivenly coupled to a load, and first and second interconnected switching wires electrically and thermally coupled to the actuator wire through an electrical toggle switch, wherein the switching wires form a translatable vertex engaging the switch, so as to close the circuit, in accordance with a preferred embodiment of the invention.
Figure 10A:
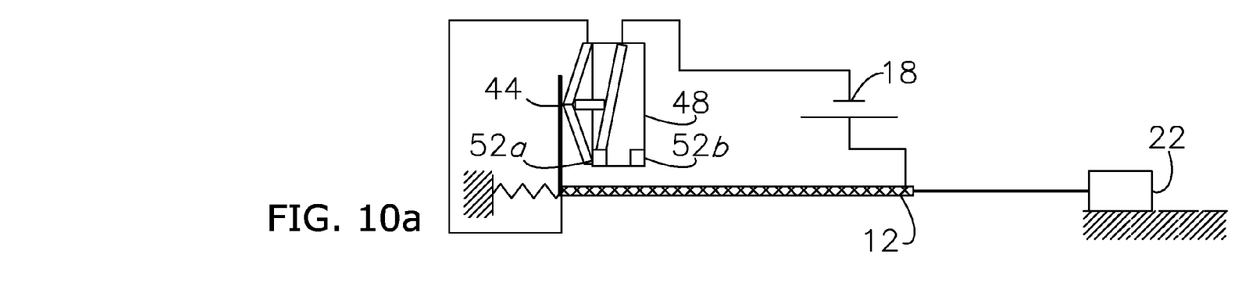
FIG. 10a is a diagram of the system shown in FIG. 10, wherein the actuator wire has been activated so as to displace the load.
Figure 10B:
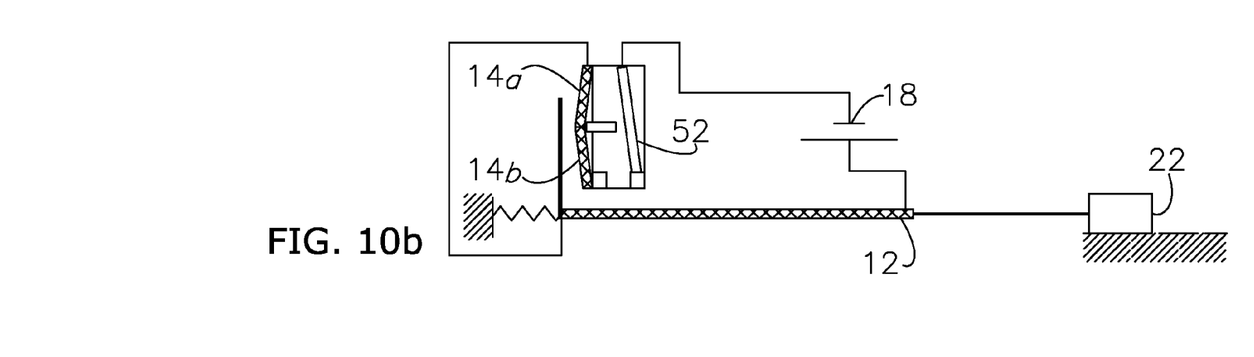
FIG. 10b is a diagram of the system shown in FIG. 10a, wherein the switching wires have also been activated, so as to cause the vertex to toggle the switch and open the circuit.

In FIGS. 10-10b, the first and second interconnected switching wires 14a,b are electrically coupled to the actuator wire 12 through an electrical toggle switch 48. More particularly, the toggle switch 48 comprises a translatable electrical post 50, and a snapping arm bridge 52. The bridge 52 is electrically coupled to the power source 18 and operable to selectively engage a normally closed contact 52a or normally open contact 52b. The bridge 52 presents a bistable mechanism, and more particularly, achieves one of two stable positions, when it is caused to swing past center. As shown in the illustrated embodiment, the switching wires 14a,b are positioned adjacent the switch 48, such that the vertex 44 is able to engage the post 50, when the wires 14a,b are activated. Engagement causes the post 50 to float inward towards and strikes the bridge 52, so as to cause the bridge 52 to swing past center to the open stable position (FIG. 10b). A return spring or otherwise biasing mechanism (not shown) is provided to push the bridge 52 back towards the closed stable position and post 50, when the wires 14a,b deactivate.

Lastly, it is appreciated through out the afore-mentioned embodiments, that the switching wire 14 may be used to prime the actuator wire 12. Here, the power source rating is lowered, such that a lesser current inoperable to activate the actuator wire 12 is caused to flow in the circuit 16. The switching wire 14 presents a transformation temperature range substantially (e.g., more than 25%) lower than the actuator wire 12, and the wires 12,14 are in close proximity. More particularly, the switching wire 14 presents an Austenite finish temperature equal to the targeted prime temperature. In operation, when the wires 12,14 are in a cold state the switching wire 14 will be caused to close the circuit by the return spring 26 (FIG. 1). When closed, the wires 12,14 will be heated by the lesser current to the prime temperature. A driving circuit (not shown) is then better able to drive the actuator wire 12. Once heated, the switching wire 14 will actuate, thereby causing the electrical non-conductor 24 to interrupt the current flow to the actuator wire 12. As long as ambient and/or wire temperatures remain at or above the prime temperature the circuit 16 will remain open.

Figures 11, 12, 13, 14:
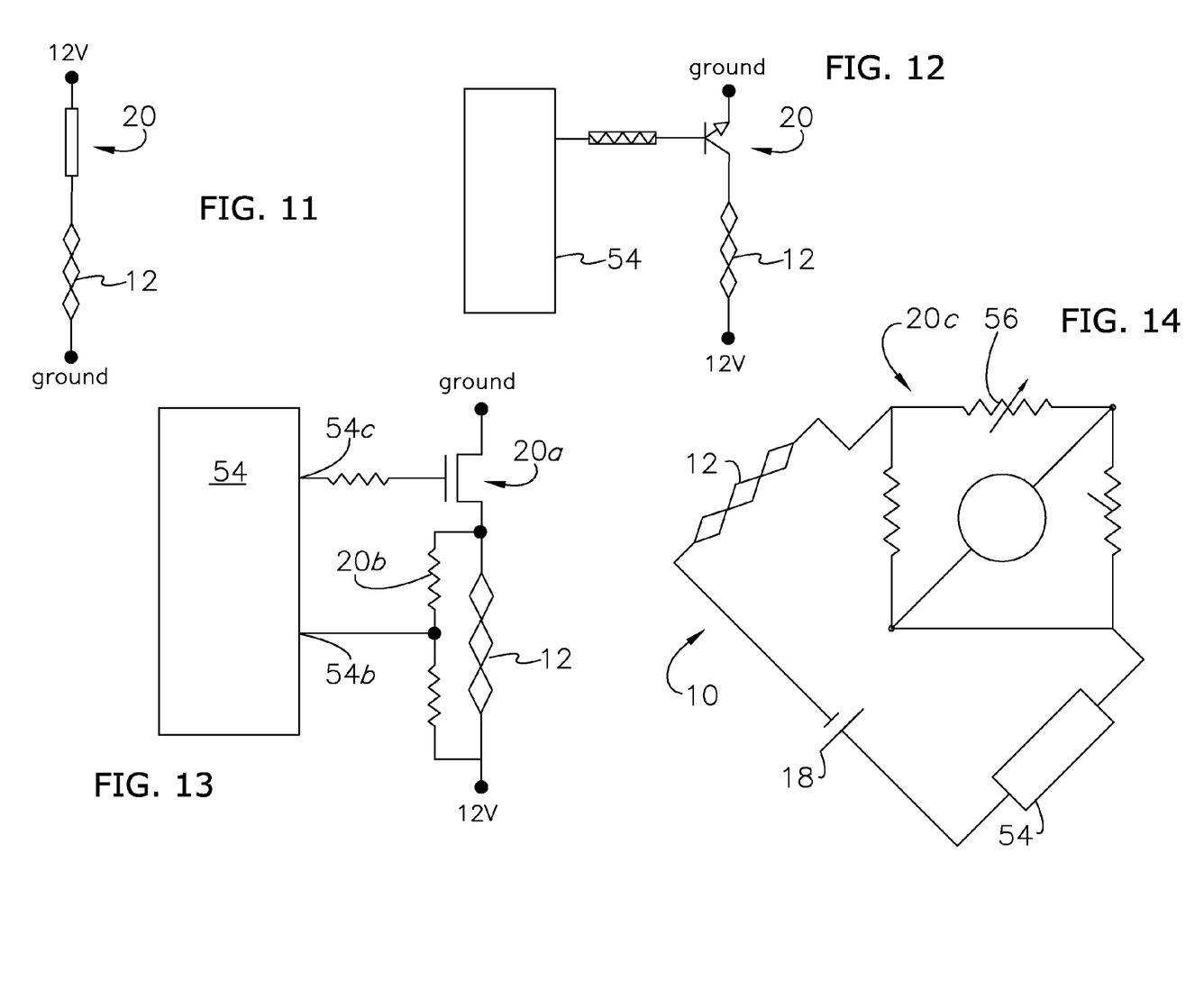
FIG. 11 is a partial diagram of a system comprising an actuator wire and circuit implement configured to modify the current delivered to the wire, in accordance with a preferred embodiment of the invention.
FIG. 12 is a partial diagram of the system shown in FIG. 11, wherein the implement is a transistor drivenly coupled to the output pin of a controller, in accordance with a preferred embodiment of the invention.
FIG. 13 is a diagram of a system comprising an actuator wire, controller and transistor and resistor implements cooperatively configured to effect on-board detection of switching, in accordance with a preferred embodiment of the invention.
FIG. 14 is a diagram of a system comprising an actuator wire, controller, and Wheatstone bridge circuit implement, wherein the bridge includes a hotwire, in accordance with a preferred embodiment of the invention.

As exemplarily shown in FIGS. 11-12, it is appreciated that other circuit implements 20 may be used to supplant the switching wire 14. That is to say, the present invention further encompasses a circuit 16 comprising a shape memory alloy actuator wire 12, and at least one circuit implement 20 that functions to control (i.e., vary, and/or turn on/off) the current being fed through the actuator wire 12. For example, suitable circuit implements 20 for use herein, include thermally activated circuit implements 20, such as an in-line resettable fuse that is electrically or thermally activated to open the circuit 16 (FIG. 11). The fuse may further include a second shape memory alloy element composing the circuit, and presenting a second transformation temperature range greater than the actuator wire range.

The implement 20 may also present a load-activated device, such as a piezoresistive element or membrane connected in series with the actuator wire 12 and operable to change in resistance upon loading. The piezoresistive implement 20 functions to decrease the activation current when the load is high which in-turn decreases the temperature of the SMA actuator 12, and reduces the load (FIG. 11).

Additional examples of circuit implements 20 include a variable resistor or potentiometer that is electrically or thermally activated to vary the resistance of a series circuit including the actuator wire 12 (FIG. 11), a selectively introducible resistor, an inductor connectable in series with the actuator wire 12 and selectively affected to stop the actuation current, a capacitor connectable in series with the wire 12 and selectively affected to stop the actuation current, a transistor in the circuit adjusting the current to the element (FIG. 12).

More particularly, a variable linear/rotational potentiometer can be connected in-series with the actuator wire 12, wherein the slider or rotational knob moved by the motion of the actuator. The potentiometer preferably has a resistance profile such that at the beginning (or normal state) it does not pose any resistance load but when the actuator wire 12 is near the end of its transportation temperature range, it poses a resistance load sufficient to stop the actuator 12 from increasing in temperature and holds there until the current is shut off. In this manner, overheating is prevented.

In FIG. 12, a transistor 20 is plugged into the analog output pin 54*a* of a controller 54 programmably configured to modify the input signal of the transistor 20. The transistor may function as an amplifier or switch. The preferred controller 54 is communicatively coupled to the source 18, actuator wire 12, and implement 20, and configured to identify an overheating event, and cause the implement 20 to modify the current when the event is identified.

Moreover, and as shown in FIG. 13, it is appreciated that transistor and resistor implements 20*a,b* may be combined to effect on-board detection and reaction to switching. Here, after the controller 54 commands transistor 20*a* to pass current through the SMA actuator 12, it starts to monitor the voltage level through the monitor pin 54*b*. Whenever the transistor 20*a* is triggered to open, the monitor pin 54*b* will detect a voltage flip from low to high. The controller 54 uses this information to lower the command pin 54*c* and therefore shut off the current to the actuator 12.

Finally, in another combination implement 20, it is appreciated that a Wheatstone bridge 20*c* may be used to provide temperature compensation, where one arm consists essentially of a hotwire (FIG. 14) 56. That is to say, a 1 mm length sensor wire that heats and reaches equilibrium much more rapidly than the SMA actuating wire 12 may be used as one element of the Wheatstone bridge 20*c*. The hotwire (i.e., sensing wire) 56 acts as a variable resistor, whose nominal timing is set for a specific temperature. Departure from that nominal temperature will result in a change in the heat necessary for the actuator 12 to undergo transformation. That is to say, at the nominal temperature, the sensing wire 56 will heat from initial temperature to sensing temperature in a nominal time; upon reaching the sensing temperature, the sensing wire 56 resistance will balance the Wheatstone bridge 20*c*. The sensing wire 56 is preferably made of tungsten, so that its resistance increases as the temperature increases.

When the actuator 12 is to be activated, the controller 54 will pulse the bridge 20*c* with a constant voltage or current for a specific time that is enough for the hotwire 56 to reach equilibrium. At the end of the pulse, the controller 54 will measure the error voltage across the bridge 20*c* and use it to condition the power heating the actuator 12. If the error voltage is zero, then the actuator 12 will be heated using a normal current/voltage profile. If a non-null value is detected, such as in the case when the ambient temperature is lower than the nominal temperature or there is a substantial heat loss due to wind, the actuator 12 may be heated with a higher power profile. If the error generates current flow in the opposite direction, such as in the case when the ambient temperature is higher than the nominal temperature, then a lower power profile may be used to effect consistent actuation.

In another mode, the bridge error can be continuously monitored by the controller 54 until it reaches equilibrium. The final error magnitude and/or other information obtained from the bridge error (such as the slope) can be used to adjust the power used to heat the SMA wire 12 for consistent performance. In the case that the ambient conditions where the SMA wire 12 resides is changing rapidly, the bridge error can be monitored continuously and information obtained can be used to adjust the power to the actuator 12 in real-time. In yet another embodiment, a controlled voltage or current ramp by the controller 54 may be used to heat the bridge 20*c* until it balances. Using the time it takes to balance (and other information such as amplitude and slope of the ramp), the ambient conditions can be discerned so that the SMA can be powered consistently. It is appreciated that the ambient conditions can be obtained during the cooling period of the hotwire 56 and used independently or together with other information (such as information obtained during heating) to corroborate or confirm the conditions.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. All ranges directed to the same quantity of a given component or measurement is inclusive of the endpoints and independently combinable.

What is claimed is:

1. An overheating protection system adapted for use with an actuator including at least one shape memory alloy element coupled to, so as to selectively receive an activation signal from a source, wherein the actuator element presents a first configuration so as to be activated by the source over a first period, and is drivenly coupled to a load, said system comprising:

at least one switching shape memory alloy element selectively coupled to the source and/or actuator element and presenting a second configuration, so as to be activated by the source and/or actuator element over a second period greater than the first, said actuator element, source and switching element being cooperatively configured such that the switching element is operable to prevent receipt of the signal by the actuator element, when the switching element is activated, wherein the actuator element presents a first transformation temperature range, and the switching element is thermally coupled to the actuator element, so as to be activated thereby, and presents a second transformation temperature range greater than the first, wherein the actuator and switching elements, and source compose a circuit, the source is operable to expose the actuator and switching elements to a current, so as to resistively generate a thermal activation signal, and the switching element is operable to open the circuit when activated, and wherein the switching element is drivenly coupled to an electrical isolator, and configured to cause the isolator to be intermediately positioned between the actuator and switching elements, when the switching element is activated.

2. The system as claimed in claim 1, wherein the actuator and switching elements are interconnected by a plurality of electrical and thermal conductors, and at least one of said conductors interconnect the isolator and switching element.

3. The system as claimed in claim 1, wherein a return spring is drivenly coupled to the switching element, and operable to closed the circuit, when the switching element is deactivated.

4. The system as claimed in claim 1, wherein the switching element is communicatively coupled to and configured to open a switch composing the circuit, when activated.

5. The system as claimed in claim 1, wherein the actuator element presents a first pre-stress, and said at least one switching element presents a second pre-stress greater than the first.

6. The system as claimed in claim 1, wherein the actuator and switching elements and source compose a circuit, and said at least one switching element is connected in parallel to a resistor.

7. An overheating protection system adapted for use with an actuator including at least one shape memory alloy element coupled to, so as to selectively receive an activation signal from a source, wherein the actuator element presents a first configuration so as to be activated by the source over a first period, and is drivenly coupled to a load, said system comprising:

at least one switching shape memory alloy element selectively coupled to the source and/or actuator element and presenting a second configuration, so as to be activated by the source and/or actuator element over a second period greater than the first, said actuator element, source and switching element being cooperatively configured such that the switching element is operable to prevent receipt of the signal by the actuator element, when the switching element is activated, wherein the actuator element presents a first transformation temperature range, and the switching element is thermally coupled to the actuator element, so as to be activated thereby, and presents a second transformation temperature range greater than the first, and wherein the actuator includes a plurality of shape memory alloy elements, and the switching element is medially positioned relative to the actuator elements.

8. An overheating protection system adapted for use with an actuator including at least one shape memory alloy element coupled to, so as to selectively receive an activation signal from a source, wherein the actuator element presents a first configuration so as to be activated by the source over a first period, and is drivenly coupled to a load, said system comprising:

at least one switching shape memory alloy element selectively coupled to the source and/or actuator element and presenting a second configuration, so as to be activated by the source and/or actuator element over a second period greater than the first, said actuator element, source and switching element being cooperatively configured such that the switching element is operable to prevent receipt of the signal by the actuator element, when the switching element is activated, wherein the actuator element presents a first transformation temperature range, and the switching element is thermally coupled to the actuator element, so as to be activated thereby, and presents a second transformation temperature range greater than the first, wherein the actuator and switching elements, and source compose a circuit, the source is operable to expose the actuator and switching elements to a current, so as to resistively generate a thermal activation signal, and the switching element is operable to open the circuit when activated, and wherein the actuator and switching elements are further connected by at least one thermally conductive and electrically non-conductive lateral member.

9. An overheating protection system adapted for use with an actuator including at least one shape memory alloy element coupled to, so as to selectively receive an activation signal from a source, wherein the actuator element presents a first configuration so as to be activated by the source over a first period, and is drivenly coupled to a load, said system comprising:

at least one switching shape memory alloy element selectively coupled to the source and/or actuator element and presenting a second configuration, so as to be activated by the source and/or actuator element over a second period greater than the first, said actuator element, source and switching element being cooperatively configured such that the switching element is operable to prevent receipt of the signal by the actuator element, when the switching element is activated, wherein the actuator element presents a first cross-sectional area, and said at least one switching element presents a total cross-sectional area greater than the first, wherein a plurality of switching elements cooperatively presents the total area, and wherein first and second switching elements are pivotally interconnected at one end, and pivotally connected to fixed structure at the opposite ends, so as to define a translatable vertex, the vertex is caused to engage an electrical contact when the switching elements are deactivated, and is spaced from the contact, so as to open the circuit, when the switching elements are activated.

10. The system as claimed in claim 9, wherein the contact composes a toggle switch, the vertex is spaced from the switch when deactivated, and caused to engage the switch, so as to open the circuit, when activated.

11. An overheating protection system adapted for use with an actuator including at least one shape memory alloy element coupled to, so as to selectively receive an activation signal from a source, wherein the actuator element presents a first configuration so as to be activated by the source over a first period, and is drivenly coupled to a load, said system comprising:

at least one switching shape memory alloy element selectively coupled to the source and/or actuator element and presenting a second configuration, so as to be activated by the source and/or actuator element over a second period greater than the first, said actuator element, source and switching element being cooperatively configured such that the switching element is operable to prevent receipt of the signal by the actuator element, when the switching element is activated, wherein the actuator and switching elements and source compose a circuit, the elements are connected in parallel, and said at least one switching element and not the actuator element is connected in series to a resistor.

* * * * *